United States Patent [19]

Potzl

[11] 3,838,360

[45] Sept. 24, 1974

[54] JUNCTION CIRCULATOR HAVING CURVED CONDUCTORS ON OPPOSITE SIDES OF PRINTED CIRCUIT BOARD

[75] Inventor: Friedrich Potzl, Rellingen, Germany

[73] Assignee: U.S. Philips Corporation, New York, N.Y.

[22] Filed: Sept. 17, 1973

[21] Appl. No.: 397,663

[30] Foreign Application Priority Data

Oct. 6, 1972 Germany ........................... 2249179

[52] U.S. Cl. ............................... 333/1.1, 333/84 M

[51] Int. Cl. ............................................ H01p 1/32

[58] Field of Search ...................................... 333/1.1

[56] References Cited

UNITED STATES PATENTS 3,522,555 8/1970 Hashimoto et al.................. 333/1.1

FOREIGN PATENTS OR APPLICATIONS 1,282,754 11/1968 Germany ............................ 333/1.1

*Primary Examiner*—Paul L. Gensler

*Attorney, Agent, or Firm*—Frank R. Trifari

[57] ABSTRACT

A circulator, comprising conductors which are provided between opposite connection terminals on an insulated plate. The conductors are situated partly on one side of the plate and partly on the other side of the plate, the parts being interconnected through passages in the plate and having a non-linear shape so as to provide a higher conductor density per unit of surface area of the plate.

4 Claims, 4 Drawing Figures

Figures 1, 2, 3, 4:
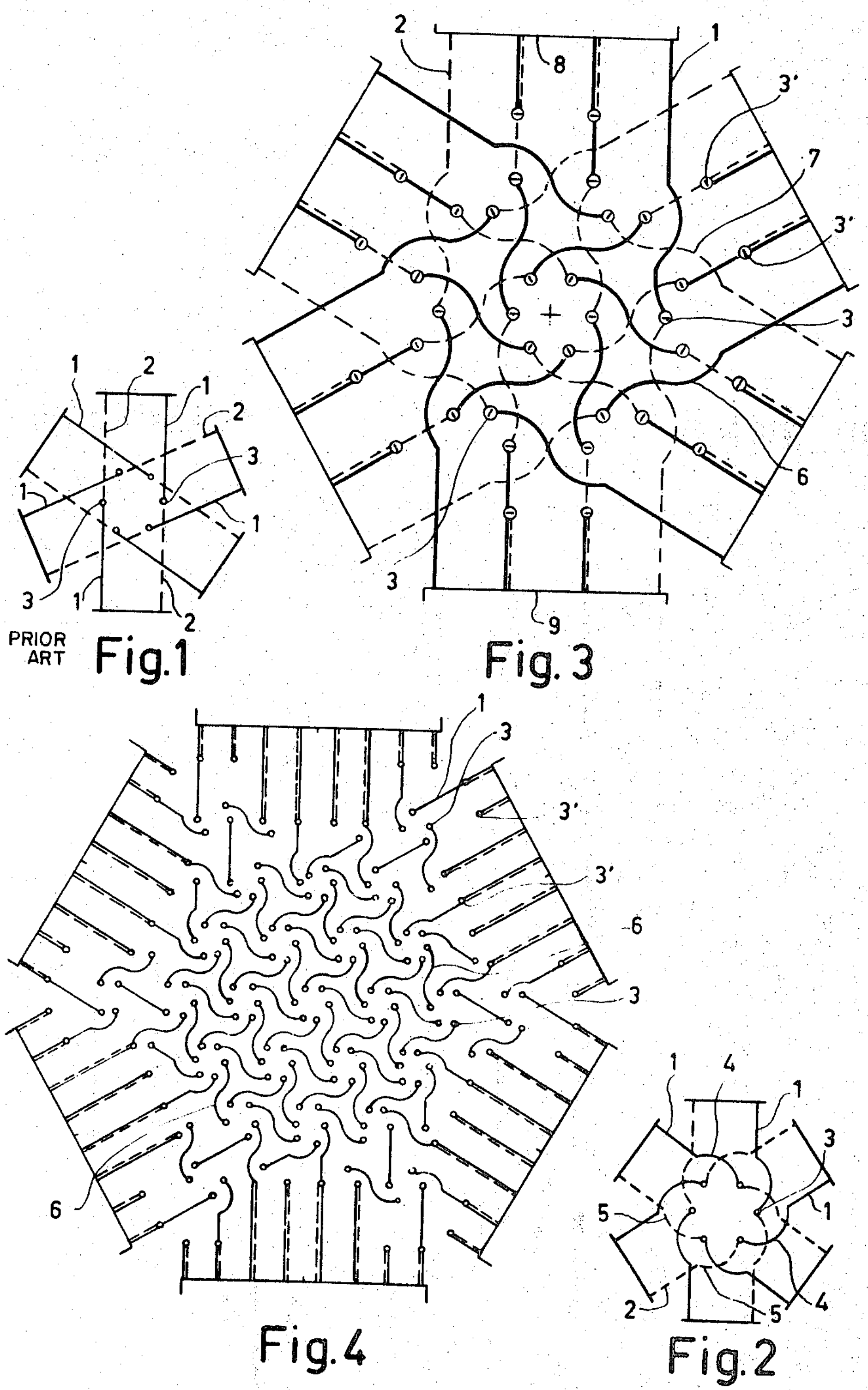

JUNCTION CIRCULATOR HAVING CURVED CONDUCTORS ON OPPOSITE SIDES OF PRINTED CIRCUIT BOARD

The invention relates to a Junction circulator of compact construction, comprising at least one disc-like body of gyromagnetic material, means for generating a static magnetic polarization field which extends perpendicular to the disc, a plate of insulating material which is arranged to be parallel and adjacent to the disc-like body, at least three connection-terminals which are arranged at mutually equal distances on the edge of the plate for supplying electromagnetic energy, and a plurality of parallel-connected current conductors which are connected to each connection terminal, which are arranged diametrically and mainly parallel to the plate, and which are interconnected on the ends which are situated on the opposite side of the connection terminal, the plate being provided with passage openings, each conductor being arranged such that it is situated for at least one part on one side and for another part on the other side of the plate while crossing the current conductors connected to the other connection terminals on the opposite side of the plate, the parts of the same current conductor which are situated on both sides of the plate being connected to each other in a conductive manner via connections provided through the passage openings.

A circulator of this kind is known, for example, from U.S. Pat. No. 3,522,555, in which FIG. 1 shows an example of the construction of a crosspoint circulator, and FIGS. 3 to 6 show different current conductor configurations, the current conductors being constructed as printed tracks. Because of lack of space, these current conductor configurations do not permit widening of the printed tracks so as to achieve a lower resistance of the conductors, or in the other words no smaller circulators having the same width of the printed tracks can thus be manufactured nor can the number of conductors per connection terminal be increased.

The invention has for its object to eliminate the said drawbacks in a very simple manner while maintaining the construction of the conductors configuration which is very suitable for bulk manufacture.

The circulator according to the invention is characterized in that the conductors have a non-linear shape. According to the invention this shape can consist, in that parts of the current conductors (arranged alternately on the upper surface and the lower surface of the plate) have a shape which is the same as that of two aligned arcs which are arcuated in opposite directions. These arcs can have approximately the shape of an S or the mirror image thereof. The plate with the conductors can be a so-termed printed circuit board. Moreover, so as to achieve a further reduction of the resistance of the individual conductors, the conductors can be formed in the vicinity of a connection terminal by parallel-connected printed tracks which are provided on the sides of the plate.

An advantage which is obtained by the step according to the invention consists in that, as a result of the non-linear shape of the individual conductors, the connections and passage openings, constructed, for example, as plated-through holes, can have a larger diameter, which means that bulk manufacture is also possible in the case of a large number of conductors per connection terminal. Moreover, as a result of the shaping of the conductors according to the invention, a lower resistance can be obtained in that the conductors which are constructed, for example, as printed tracks can be wider. Another advantage is that a comparatively large number of conductors can be realized per connection terminal, with the result that a more homogeneous conductor configuration is obtained which produces an increased bandwidth of the circulator.

The invention and its advantages will be described in detail hereinafter with reference to the Figures, corresponding parts in the various Figures being denoted by the same reference numerals.

FIG. 1 is a diagrammatic representation of a prior art embodiment comprising two current conductors per connection terminal, FIG. 2 shows an embodiment of the current conductor configuration according to the invention which is similar to FIG. 1, FIG. 3 shows an embodiment according to the invention for four current conductors per connection terminal, and FIG. 4 shows an embodiment according to the invention for eight current conductors per connection terminal.

Based on the state of the art described in the preamble, FIG. 1 shows two current conductors per connection terminal. The current conductors situated on the upper surface of the insulating plate are denoted by uninterrupted lines and the reference 1, whilst the conductors situated on the lower surface are denoted by broken lines and the reference 2. The reference 3 denotes the connections and passages which are constructed, for example, as plated-through holes, at least six of these being required for two conductors per connection terminal as is shown in this Figure. The circulators of very small dimensions can be realized, in spite of the fact that the round plated-through holes must have a minimum diameter of 0.2 to 0.3 mm, if the step according to the invention is performed, that is to say, if the parts of the current conductors 1 and 2 have a non-linear shape as is shown in FIG. 2. This Figure shows parts of current conductors which are arranged about the plated-through holes 3 in the form of arcs 4 and 5.

It is to be noted that for the plate use can alternatively be made of a thin foil which is made of a suitable synthetic material, whilst the current conductors can consist of solid wires which can be inserted through the passage openings of the foil and can be wound about the foil. A construction of this kind, however, is too labour-intensive so as to be used for bulk manufacture. However, constructions of this kind can be used for power circulators in which the wires are formed by flat tubes of rectangular section and which are correspondingly shaped for the remainder.

FIGS. 3 and 4 show how little surface area is present between the plated-through holes 3 for accommodating the current conductors in the case of a large number of current conductors per connection terminal. As can be readily seen from FIG. 4, in the case of eight conductors per connection terminal there would be no spacing between these conductors and the plated-through holes 3 if the current conductors were linear or this spacing would be so small that voltage flash-overs would occur. This is because it is not possible to increase the space required for the braiding of the conductors at wish. The electrical length of each conductor must remain smaller than one quarter of the operating wavelength so as to ensure proper circulator action. FIGS. 3 and 4 show that also in this case the parts of each current conductor which are situated between two plated-through holes cross at least two other current conductors. The current conductors in the embodiment such as is shown, for example in FIG. 3, have the shape of an S or that of the mirror-image of an S. These shapes are denoted by the reference numeral 6 for the parts of the current conductors which are arranged on the upper surface, and by the reference numeral 7 for the current conductor parts which are situated on the lower surface of the plate. In FIG. 4, the parts of the current conductors 7 which are situated on the lower surface of the plate are not shown so as to maintain clarity of the Figure.

The S-shape of the parts of the printed tracks causes a slight increase of the resistance of the conductors as a result of the increased length of these conductors in comparison with a linear printed track of the same width, but as a result of the arcuated shape of these parts of the conductors it is possible to design these parts to be wider, so that a lower resistance per conductor is obtained than is possible for a linear conductor. By constructing the conductors according to the invention, for example, resistances have been realized which amounted to 60 percent of those of the circulators provided with linear conductors.

Another example of what can be achieved by the step according to the invention is that a circulator having a conductor configuration as shown in FIG. 3 was realized, in which the length measured from the line 8 to the line 9 in FIG. 3 amounted to only 12 mm and in which the diameters of the plated-through holes were still sufficient to be realized in a bulk manufacturing process.

FIGS. 3 and 4 furthermore show that the conductors from the connection terminals to the first plated-through holes 3 and from the last plated-through holes to the interconnection are constructed as strip-like conductors which are arranged on both surfaces of the plate so as to reduce the resistance of these conductors.

What is claimed is:

1. A junction circulator, comprising at least one disc-like body of gyromagnetic material, means for generating a static magnetic polarization field which extends perpendicular to the disc, a plate of insulating material which is arranged to be parallel and adjacent to the disc-like body, at least three connection terminals which are arranged at mutually equal distances on peripheral portions of the plate for supplying electromagnetic energy, and a plurality of elongate current conductors which are parallel-connected to each connection terminal, and extending substantially in radial direction with respect to the disc the plate being provided with passage openings, at least one part of each conductor being arranged on one side and the other conductor part on the other side of the plate, the parts of the same current conductors being connected to each other through the passage openings, and the conductors having a curved shape to provide a higher conductor density per a surface area unit.

2. A circulator as claimed in claim 1, characterized in that the parts of the current conductors have a shape of two aligned arcs which are arcuated in opposite directions.

3. A circulator as claimed in claim 1, characterized in that the plate with the current conductors is constructed in the form of a printed circuit board.

4. A circulator as claimed in claim 1, characterized in that the end portions of the current conductors are constructed as printed tracks which are situated on both surfaces of the plate.

* * * * *

PO-1050
(5/69)

UNITED STATES PATENT OFFICE
CERTIFICATE OF CORRECTION

Patent No. 3,838,360 Dated September 24, 1974

Inventor(s) FRIEDRICH PÖTZL

It is certified that error appears in the above-identified patent and that said Letters Patent are hereby corrected as shown below:

On the title page Section [30] change "2249179" to

--P.2249179.8--.

Signed and sealed this 26th day of November 1974.

(SEAL)
Attest:

McCOY M. GIBSON JR.
Attesting Officer

C. MARSHALL DANN
Commissioner of Patents